Feb. 25, 1958
N. KNUDSEN
2,824,978
ARRANGEMENT FOR POLYPHASE NETWORKS PROVIDED
WITH MEANS FOR HIGH SPEED RECLOSING
Filed Oct. 26, 1954
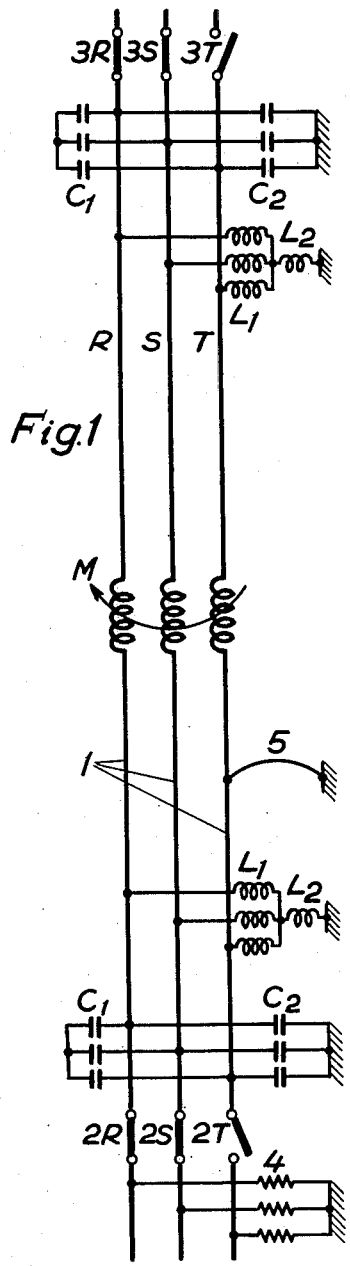
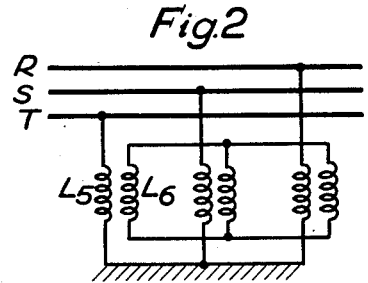
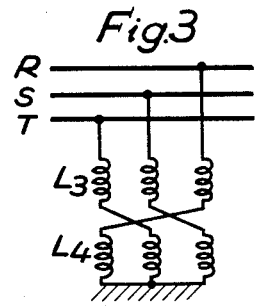
INVENTOR.
NIELS KNUDSEN
BY
Attorney.

United States Patent Office 2,824,978
Patented Feb. 25, 1958

2,824,978

ARRANGEMENT FOR POLYPHASE NETWORKS PROVIDED WITH MEANS FOR HIGH SPEED RECLOSING

Niels Knudsen, Vasteras, Sweden, assignor to Allmanna Svenska Elektriska Aktiebolaget, Vasteras, Sweden, a corporation of Sweden Application October 26, 1954, Serial No. 464,857

Claims priority, application Sweden November 9, 1953

9 Claims. (Cl. 307—105)

The arrangement concerns polyphase A. C. power networks with earthed neutral, in which high speed reclosing is used for eliminating transient earth faults. In order to safeguard the stability of the power transmission between two generating network groups as much as possible, it has been suggested that the high speed reclosing, i. e. tripping with the following reclosing, should comprise as few phases as possible. As for instance a single-phase earth fault only the faulty phase should be transiently disconnected, whilst the sound phases should remain closed and participate in the power transmission. It has, however, appeared that the arc between the faulty phase and earth at single-phase high speed reclosing does not always extinguish during the deenergized interval, because the arc is fed from the sound phases being under tension. As a remedy against this, grounding of the faulty phase during the de-energized interval has been suggested, whereby the faulty, disconnected phase assumes earth potential, and the arc would extinguish. Disregarding that such an earthing arrangement is expensive, it also represents an undesirable complication, bearing in mind that the earthing device contains movable parts, which must work in a certain relation of time to the main circuit breakers in the A. C. network.

The present invention eliminates the mentioned drawbacks thereby that reactors are arranged on the line side of the line circuit breakers, which reactors are designed in such a way that their inductances compensate the phase-to-phase and phase-to-earth capacitances of the line to such a degree that an arc formed between the faulty phase and earth and fed by coupling from the sound phases can extinguish.

Fig. 1 gives a survey of the questions allied to the theory and shows a certain form of the compensating reactor arrangement. Figs. 2 and 3 show other forms of the mentioned reactor arrangement.

In Fig. 1 a three-phase A. C. line with its phases R, S and T is indicated by 1. The line is in its lower end limited by the circuit breaker 2 with its three poles 2R, 2S and 2T. The control means for the circuit breaker poles are made in such a way that each pole can be operated individually. In Fig. 1 the poles 2R and 2S are closed, whilst 2T is shown open, considering that earth fault is assumed to have taken place in the point 5 of the phase T. In the same way the line is in its upper end limited by the breaker 3 with its poles 3R, 3S and 3T, the last mentioned of which is shown open. The line is fed from a three-phase current source 4, the neutral of which is earthed. As indicated, the different phases of the line are coupled with each other both capacitively and inductively. For the sake of simplicity the capacitive coupling is assumed to be concentrated in the both ends of the line. After having paid consideration to correction terms, $C_1$ indicates the star-connected phase-to-phase-capacitance of the half line reckoned per phase. $C_1$ is equal to $3C_h$, $C_h$ representing the delta-connected capacitances between the phases R and S, S and T, and T and R, respectively. In the disconnected phase a voltage is generated by the capacitive voltage dividing between a sound phase, the faulty phase and earth. This voltage makes a capacitive current flow from the current source 4 via earth, the fault point 5, the phase capacitance $C_1$ to the sound phases and back to 4, thus feeding the arc. This current is substantially proportional to the length of the line. In the middle of the line also the magnetic coupling between the phase is schematically shown, which is formed by the mutual inductance of the phase. The magnetic coupling is indicated by M and causes the current flowing in a sound phase to induce a voltage in another phase, even if this one, being the case with the phase T, is disconnected in the both ends. This voltage induced in phase T by magnetic coupling makes, in a network without line reactor, a current flow via the fault point 5, earth and the phase-to-earth capacitance, $C_2$, of the disconnected phase. This current also keeps up the arc in the fault point and makes its extinguishing difficult. The current is mainly proportional to the square of the line length. A condition for the extinguishing of the arc during the de-energized interval of the reclosing process is that the current in the fault point is not too large. In order to reduce the capacitively induced current, according to the invention, the capacitance $C_1$ between the phases is compensated. This is obtained in the easiest way thereby that reactors are connected in delta or star between the phases. The required reactor power is concentrated in a group of reactors, which can be placed in any point of the line or be divided up in several groups, arranged in different points of the line. It is essential, however, that the reactors are arranged on the line side of the line circuit breakers. If they, which is the case with reactors provided for other purposes, would be installed on the station-side of the circuit breakers in the stations, they would be disconnected from the line, when one or more of the breaker poles have tripped. In order to reduce the inductively induced current, according to the invention, also the phase-to-earth capacity, $C_2$, is compensated. This compensation is mainly applied at long lines and is obtained by means of groups of reactors, arranged in each of the line terminals on the line-side of the line breakers. By connecting in the groups of reactors, the resulting phase-to-earth impedance is increased, and that current is considerably decreased, which is caused by the voltage induced in the disconnected phase and flowing via earth and the fault point.

For both kinds of compensation it is valid that the compensation is carried out to such a degree that an arc occurring between the faulty phase and earth extinguishes. This means that the degree of compensation for each of them can be less than 100%. The degree of compensation for the reduction of the inductively induced current can also become zero, especially on short lines.

The described compensation of the line capacitances by means of reactors also involves advantages in respect of closing and disconnecting long lines. The over-voltages, which occur, when unloaded lines are closed or disconnected and when lines affected with earth-fault are disconnected, are essentially reduced, when line reactors of the described type are arranged.

The compensation of the capacitances $C_1$ and $C_2$ is suitably carried out by means of groups of reactors, which are common for the two purposes. These groups are then arranged on the line-side of the circuit breakers in both ends of the line, e. g. that one shown in Fig. 1. Taken by itself, for a three-phase system a group consisting of six reactors can be thought, three of which being provided to compensate the phase-to-phase capacitance, $C_1$ or $C_h$, and three to compensate the phase-to-earth capacitance, $C_2$. According to the invention, however, the number of the reactors can be reduced in different manners, the individual inductances of the group of reactors being connected with each other in such a way that the zero-sequence reactance of the group is larger than its positive-sequence reactance. The coupling between the individual inductances may be impedive, as shown for the group of reactors in Fig. 1. Besides this it can, however, be inductive as shown by the examples shown in Figs. 2 and 3.

The positive-sequence reactance in a polyphase system means, as known, the reactance opposing to a symmetrical polyphase voltage (in the adopted phase sequence). By zero-sequence reactance, on the other hand, that reactance, reckoned per phase, is indicated, which opposes to a (single-phase) voltage between earth and the phases (the phases being connected in parallel). Thus the capacitive positive-sequence reactance of the line is formed by the capacitances $C_1$ and $C_2$ connected in parallel, and the positive-sequence reactance of the group of reactors must be in the case of full compensation:

$$\omega L_+ = \frac{1}{\omega C_+} = \frac{1}{\omega(C_1+C_2)}$$

In the group of reactors shown in Fig. 1 the positive-sequence inductance per phase consists of the inductance $L_1$, the dimensioning formula thus being:

$$\omega L_1 = \frac{1}{\omega(C_1+C_2)}$$

The phase-to-earth capacitance of the line, reckoned per phase, is, on the other side, compensated by the zero-sequence inductance of the group of reactors. The zero-sequence inductance in Fig. 1 is obtained by connecting in series the individual inductances $L_1$ and $L_2$, paying consideration to their impedive coupling. Because the sum of the reactances per phase for $L_1$ and $L_2 \cdot 3$ has to be equal to the zero-sequence capacitance per phase of the line $$\frac{1}{\omega C_2}$$

the dimensioning at full compensation is:

$$\omega L_2 = \frac{C_1}{3C_2} \cdot \frac{1}{\omega(C_1+C_2)}$$

The feature of the group of reactors according to Fig. 1, forming a zero-sequence reactance by coupling between the individual inductances, which reactance is higher than the positive-sequence reactance of the group, is also obtained in other designs, two examples of which being shown in Figs. 2 and 3. In Fig. 2 the group of reactors consists of three reactors, each fitted with a secondary winding. The main winding of the reactors is indicated by $L_5$, the secondary winding by $L_6$. The secondary windings are connected in parallel. At positive-sequence phase-to-phase currents, equalizing currents can flow in the secondary windings, the reactance opposing to the symmetrical three-phase voltage being comparatively low. At zero-sequence current, however, the windings $L_5$ are passed by currents in the same direction. This means that the voltages generated in the secondary windings are opposed to each other, preventing circulation of a secondary current. This has as the result that the winding $L_5$ represents a comparatively large inductance for zero-sequence currents. Fig. 3 shows another example of a group of reactors, the individual inductances of which being magnetically coupled with each other. Each reactor is fitted with two windings indicated by $L_3$ and $L_4$, respectively, in Fig. 3. Currents caused by the symmetrical polyphase voltage pass the windings $L_3$ and $L_4$ more or less in opposite directions, the conjoint inductance of the windings thus becoming less than that of $L_3$ alone. Zero-sequence current flowing at earth-fault passes, on the other hand, the winding $L_4$ in the same direction as the winding $L_3$, the fields of the winding thus co-acting and the conjoint inductance becoming higher than that of $L_3$ alone. In case of partial compensation the inductances of the reactors are made higher than adequate to the capacitance value of the line. On shorter lines, in which the inductively induced current is small in relation to the capacitively transmitted one, the zero-sequence inductance of the group is suitably designed infinitely high, which means that the group of reactors becomes of a simpler design and not earthed.

Line reactors of the mentioned type have above all to be active, when a fault occurs on the line and the reclosing process is started. Furthermore, the reactors have to fulfil a task, when the line is lightly or not loaded. When the line, on the other hand, is sound and normally loaded, it can be desirable to make the compensation reactors completely or partly ineffective. According to a modification of the invention the reactors are, therefore, controlled in such a way that they are active mainly, when the line is lightly loaded or affected by a fault. This can be achieved thereby that the reactors are connected to the line by means of breakers operated in dependence on the line conditions. These breakers need not be designed for the short-circuit capacity of the line but only for the rated current of the group of reactors. Alternatively the reactors can be provided with special control windings influencing their main field in such a way that the density of the field lines is changed dependent on the state of the line. In this way the active inductance of the reactors can be changed, so that compensation of the line-capacitance mainly takes place at the mentioned service conditions, whilst the reactive power consumed by the reactor becomes substantially less on a heavily loaded line.

I claim as my invention:

1. Arrangement in polyphase networks, the neutral of which is directly earthed and which are provided with means for single-phase high speed reclosing of the circuit breakers in the faulty phases, comprising reactors arranged on the line-side of the said breakers and so designed that their inductances compensate the phase-to-phase and the phase-to-earth capacitances of the line to such a degree that an arc, formed between a faulty phase and earth and fed by coupling from the sound phases, can extinguish.

2. Arrangement according to claim 1, in which the reactors are assembled in groups, the individual inductances of which are coupled with each other in such a way that the zero-sequence reactance of a group of reactors is higher than its positive-sequence reactance.

3. Arrangement according to claim 2, in which the group of reactors consists of reactors connected to the phases and forming a neutral, as well as of a reactor connected between this neutral and earth.

4. Arrangement according to claim 2, in which the group of reactors consists of reactors connected to the phases and forming an earthed neutral, the reactors being provided with secondary windings, which are connected with one another.

5. Arrangement according to claim 2, in which the group of reactors consists of reactors connected to the phases and forming an earthed neutral, each reactor being provided with at least two windings, the inductances of which co-acting for zero-sequence currents and opposing to each other for positive-sequence currents.

6. Arrangement according to claim 2, in which the zero-sequence reactance of a group of reactors is practically infinitely high.

7. Arrangement according to claim 1, comprising means making the reactors active chiefly, when the line is affected by fault, lightly loaded or not loaded.

8. Arrangement according to claim 7, comprising means whereby the reactors are connected to the line via circuit breakers operated in dependence on the state of the line.

9. Arrangement according to claim 7, comprising means changing the density of the magnetic field-lines in the reactors in dependence on the state of the line.

References Cited in the file of this patent

UNITED STATES PATENTS

| | | |
|---|---|---|
| 1,537,371 | Petersen | May 12, 1925 |
| 1,814,557 | Jonas | July 14, 1931 |
| 1,953,233 | Jonas | Apr. 3, 1934 |